United States Patent [19]

Wiggans

[11] 4,209,038
[45] Jun. 24, 1980

[54] FUEL METERING VALVE WITH POROUS ELEMENT

[75] Inventor: John M. Wiggans, Indianapolis, Ind.

[73] Assignee: General Motors Corporation, Detroit, Mich.

[21] Appl. No.: 943,042

[22] Filed: Sep. 18, 1978

Related U.S. Application Data

[63] Continuation of Ser. No. 770,577, Feb. 2, 1977, abandoned.

[51] Int. Cl.² .............................................. E03B 7/07
[52] U.S. Cl. .................................... 137/547; 210/390; 210/391
[58] Field of Search ................ 137/547; 210/390, 391, 210/429, 393, 416 F, 425, 427, 500 R, 503; 60/39.28 R

[56] References Cited

U.S. PATENT DOCUMENTS

| 937,676 | 10/1909 | Elliot | 210/390 |
|---|---|---|---|
| 968,822 | 8/1910 | Weinland | 210/390 |
| 999,532 | 8/1911 | Watters | 210/390 |
| 1,103,725 | 7/1914 | Wood | 210/391 |
| 1,168,668 | 1/1916 | Morgan | 210/390 |
| 3,007,199 | 11/1961 | Curtis | 210/390 |
| 3,019,903 | 2/1962 | Daane | 210/391 |
| 3,241,676 | 3/1966 | Neuville et al. | 210/391 |
| 3,321,173 | 5/1967 | Seger | 251/61.4 |
| 3,348,694 | 10/1967 | Smith | 210/390 |
| 3,542,337 | 11/1970 | Scaramucci | 251/315 |
| 3,779,388 | 12/1973 | Coughlin | 210/390 |
| 3,823,831 | 7/1974 | Le Blanc, Jr. | 210/429 |
| 4,010,390 | 3/1977 | Sands | 251/309 |
| 4,056,474 | 11/1977 | Snouffer | 210/390 |

FOREIGN PATENT DOCUMENTS 517649  5/1930  Fed. Rep. of Germany ........... 137/547

Primary Examiner—William R. Cline
Assistant Examiner—H. Jay Spiegel
Attorney, Agent, or Firm—J. C. Evans

[57] ABSTRACT

A fuel metering valve has a housing bore between an inlet and outlet which supportingly receives a movable valve element including an imperforate end plate and an annular, porous metal plate for regulating flow between the inlet and the outlet; the imperforate end plate includes an axial reference surface thereon to overlap the inlet and outlet to prevent flow therebetween. When the valve is initially opened to a low flow rate metering position, the reference surface is moved with respect to the inlet and outlet to interpose a predetermined planar extent of porous material for limited flow of fluid between the inlet and outlet with metering established by the flow area of interstices in the porous material rather than dimensional relationships between the reference surface and walls of the inlet and outlet.

3 Claims, 4 Drawing Figures

FUEL METERING VALVE WITH POROUS ELEMENT

This is a continuation of application Ser. No. 770,577, filed Feb. 2, 1977, now abandoned.

This invention relates to fuel metering valves and more particularly to fuel metering valves for gas turbine engine applications.

Gas turbine engine operation may include an operating mode wherein very low quantities of fuel are directed into a fuel combustor during engine idle operation.

Under such conditions, it has been observed that metering valve pressure drops must be maintained very low in order to obtain an opening area large enough to adequately minimize the effects of dimensional tolerances in the stack up of parts in the metering valve assembly. When such low pressure drop conditions occur, pressure drop control or regulator valve assemblies used in association with the metering valve must be extremely accurate and this again requires unusually precise dimensional accuracy in the component parts of the associated pressure control or regulator valve assemblies.

Accordingly, an object of the present invention is to provide a metering valve with non-precision tolerance parts which produces accurate metering areas in response to positioning of a valve for reduced quantities of fuel flow therethrough and to do so my means of porous valve components with open flow interstices therethrough and including associated means for preventing collection of dirt in the pores of the porous component of the valve assembly.

Still another object of the present invention is to provide an improved metering valve assembly having flow therethrough varied approximately directly with fluid pressure drop thereacross instead of as the square root of pressure drop thereacross by use of a porous metal valve component therein with flow interstices therethrough that define the flow metering area from the inlet to the outlet of the valve assembly.

Still another object of the present invention is to provide an improved fuel metering valve assembly having a housing with an inlet and an outlet therefrom and including a valve element of porous material in the housing; the element having flow area therethrough adjustably positioned between the inlet and outlet and with a variable flow area restriction therein determined by the exposed surface area of the porous material overlying the outlet and wherein the valve element includes an imperforate segment thereon that initially closes the outlet and is movable away from the closed position to a low fuel flow rate position which exposes at least part of the outlet to a substantial surface area of the porous material which has inlets to interstices that together define a low flow rate metering area when the valve is moved initially open.

Yet another object of the present invention is to provide an improved fuel metering valve of the type set forth in the preceding paragraph wherein the porous valve element has a surface area thereon greater than the extent of the flow area through the inlet and positioned with respect to the inlet and moved with respect thereto to change the surface area of the porous valve element exposed to the inlet flow and by the further provision of means to direct a filtered flow of inlet fuel to the metering valve across the planar extent of the surface area of the porous valve element to periodically backwash accumulations of material from the surface of the porous element exposed to the inlet flow to the valve assembly.

Further objects and advantages of the present invention will be apparent from the following description, reference being had to the accompanying drawings wherein a preferred embodiment of the present invention is clearly shown.

Figure 1:
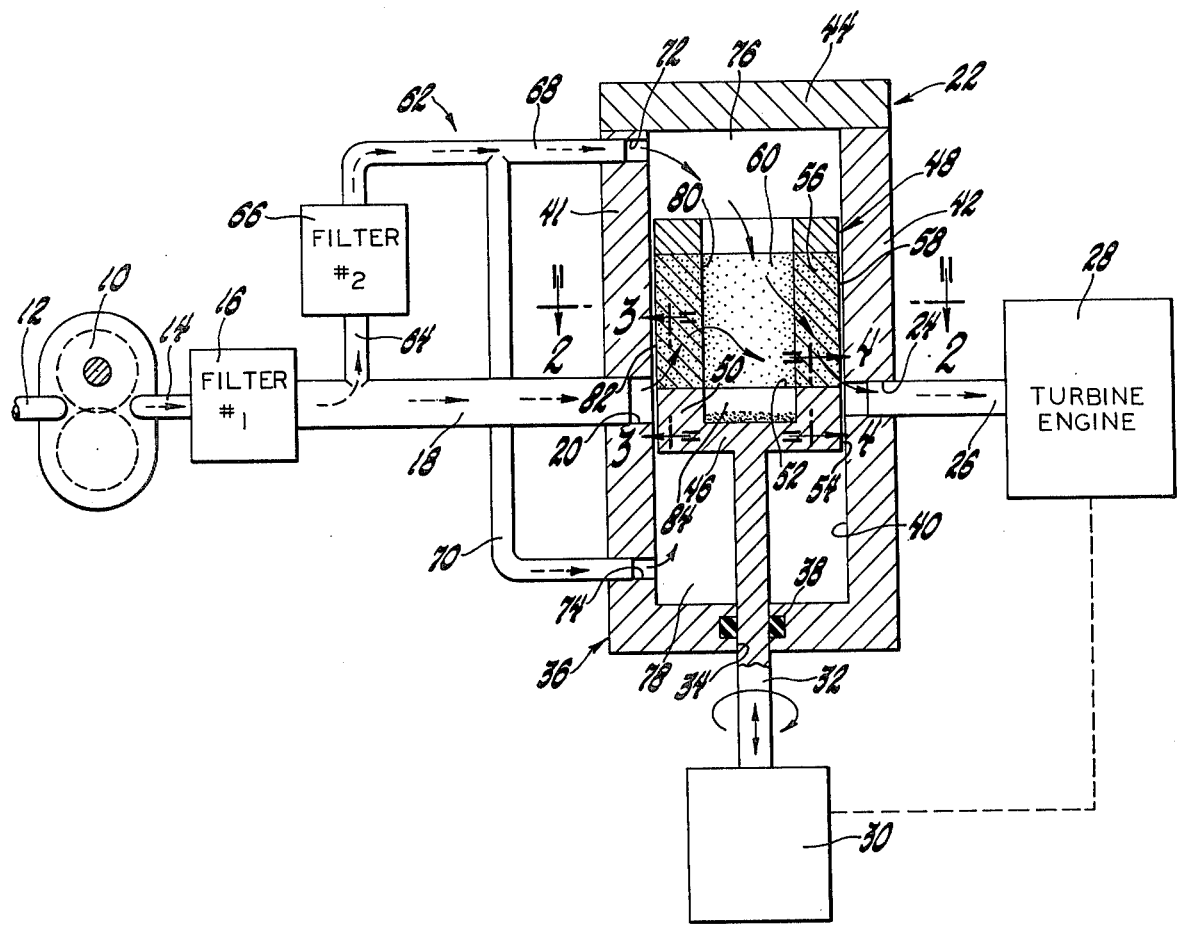
FIG. 1 is a diagrammatic view of a fuel supply system including the fuel metering valve of the present invention.

Referring now to FIG. 1, a fuel supply system is illustrated including a fuel supply system pump 10 having an inlet 12 connected to a source of fuel and an outlet 14 connected to a first filter assembly 16 from whence fuel is directed through a supply conduit 18 to the inlet 20 of a fuel metering valve assembly 22 constructed in accordance with the present invention. An outlet 24 of the valve assembly is connected by a conduit 26 to a gas turbine engine 28 which is characterized by inclusion of a combustor assembly having the fuel supply thereto controlled in accordance with a signal regulating the position of a linear and rotary drive mechanism 30 for positioning the metering valve assembly 22 to produce regulated flow of fuel from the pump 10 to the combustor 28 in accordance with the desired engine operation.

Such engines are characterized by the idle operating or deceleration modes wherein only reduced fuel flow rates are required for maintenance of turbine inlet temperatures.

The drive mechanism 30 has its output connected to a valve element shaft 32 directed through an opening 34 in a valve housing 36. The opening 34 is sealed by an O-ring element 38.

The housing 36 includes a bore 40 therethrough in communication with both the inlet 20 and the outlet 24 formed in side wall portions 41, 42, respectively, of the housing 36. The housing includes a cover 44 that closes an upper open end of the bore 40 as shown in FIG. 1. The shaft 32 is connected to an imperforate base 46 on a valve element 48 constructed in accordance with the present invention. The valve element 48, more particularly, includes an imperforate annular wall 50 with an axial extent between the base 46 and an upper edge 52 on the annular wall 50 of sufficient length to cause the imperforate base 46 to completely overlie the inlet 20 and the outlet 24 when the valve element 48 is in a closed position.

Figure 2:
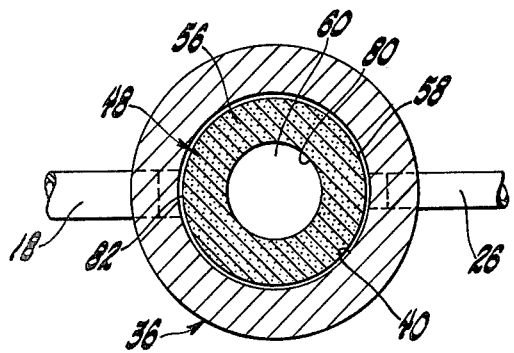
FIG. 2 is a horizontal sectional view taken along the line 2—2 of FIG. 1 looking in the direction of the arrows.

In the illustrated arrangement, the outer peripheral surface 54 on the base 46 has an outer diameter corresponding to the inner diameter of the bore 40 to be supported thereon for guided reciprocal movement of the valve element 48 within the bore 40. The valve element 48 further includes a tubular porous segment 56 which can be fabricated from porous metal or other porous material including sintered metal so long as the porous segment 56 includes open interstices constituting 20% voids therethrough for passage of fuel from the outer peripheral surface 58 of the valve element 56 in the vicinity of the inlet 20 thence through a central opening 60 within the tubular porous segment and across a segment of the outer peripheral surface 58 overlying the outlet 24 as shown in FIG. 2. Since the porous segment 56 has limited voids therethrough (representatively stated in the 20% range) it acts as a substantial flow restriction to closely control flow of fluid from the inlet 20 to the outlet 24 when the valve element 48 is shifted from a closed position to a position where the imperforate outer wall 50 first moves out of alignment with the inlet and outlet openings 20, 24.

Accordingly, in the assembly 22 the porous metal segment 56 constitutes the primary pressure loss control across the assembly 22 and the areas of the openings 20 and openings 24 and the dimensional control of the axial extent of the annular wall 50 and diameters of openings 20, 24 need not be precise and close tolerance. For example, initial opening can produce an area five times larger through the openings 20 and 24 than that present in the exposed surface area of segment 56 so that dimensional tolerance differences heretofore required in closely controlled flow regulating mechanism for gas turbine engines can be eliminated.

When viscous force is increased due to the small clearances in openings through porous segment 56 the viscous forces themselves change the flow characteristics of the device. Heretofore, pressure drop characteristics through variable orifice controls are proportional to the square root of pressure drop. The provision of a porous element in the valve structure causes the pressure flow characteristics of the assembly 22 to be directed more toward a relationship where flow is proportional to pressure drop rather than the square root of pressure drop. Accordingly, in the present arrangement, flow through the valve will vary directly with the amount of flow area through the porous segment 56 which progressively increases once the peripheral wall 50 of the imperforate base 46 clears at least some part of the flow area of the inlet 20 and outlet 24.

Furthermore, at very low flows such as exist during idle operation from any gas turbine engines, large inlet and outlet areas and valve movements can be maintained under the small fuel flow conditions required for idle operation because the porous segment 56 is the valve restriction rather than movement of edge 52 with respect to openings 20, 24. Also, by use of the porous metal segment, the illustrated valve will have flow therethrough which varies approximately directly with pressure drop instead of with the square root of pressure drop.

Another feature of the present invention is that an auxiliary filter system is included in association with the valve assembly 22 for directing self-cleaning fluid across the valve element to prevent a build up of particles on the surfaces of the porous segment 56.

More particularly, the system includes an auxiliary filtering network 62 having an inlet 64 in communication with the conduit 18 to direct a controlled amount of the fuel flow through a fine filter 66 to assure filtering of particles entering the network 62. The network includes outlet branches 68, 70 connected to openings 72, 74, respectively, in the valve wall 41 as shown in FIG. 1. The openings 72, 74 communicate with an upper end space 76 and a lower end space 78, respectively, of the bore 40 on opposite ends of the valve element 48. The fine filter 66 filters out dirt ahead of the spaces 76, 78 so as to direct a leakage flow from the spaces 76, 78 across the clearance between the outer surface 54, the outer surface 58 and the wall of bore 40. Concurrently, the drive mechanism 30 is configured to cause the shaft 32 to rotate about its longitudinal axis so as to cause different segments of the outer surface area of the porous segment 56 to be periodically back flushed by fluid flowing through the opening 60 from the inner surface 80 of the porous element 56 to the outer surface thereof.

Figure 3:
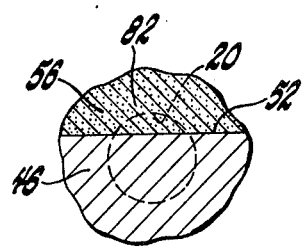
FIG. 3 is a fragmentary, vertical sectional view taken along the line 3—3 of FIG. 1 looking in the direction of the arrows.
Figure 4:
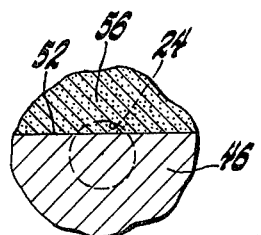
FIG. 4 is a fragmentary, vertical sectional view taken along line 4—4 of FIG. 1 looking in the direction of the arrows.

More particularly, in operation, and with reference to FIGS. 1, 3 and 4, when a region 82 on the outer surface of the porous element 56 is in alignment with the inlet opening 20 flow of fluid will pass therethrough and be subjected to the orifice control effect of the open voids or interstices through element 56 to regulate the amount of fuel flow to the turbine 28 depending on the surface area of region 82. This control element determines flow rather than the relationship of the reference surface 52 on the imperforate base portion 50 of the valving element 48 with respect to the flow area of the inlet opening 20 and the flow area of the outlet 24. Periodically, the shaft 32 will be rotated a predetermined arcuate extent to move the region 82 counterclockwise as shown in FIG. 2 out of alignment with the opening 20. The region 82 then has leakage flow paths thereacross to force any small particles into the lower space 78 or, if they are carried by the fluid through the voids in the porous material, they can accumulate in a pocket 84 formed as a recess within the base 46.

In a preferred embodiment, the flow area of the inlet 20 is much larger in area (for example, five times) than the metering area defined by the region 82 when it is in alignment with the opening 20. Under extreme conditions where a large slug of dirt passes through the inlet 18, the area 82 may clog causing all flow to pass through the filter 66. At this time, self cleaning from reverse flow across the outer diameter 58 and the inner diameter 80 of the porous segments 56 occurs. Dirt on the inner diameter 80 will be collected within the pocket 84 and dirt on the outer surface will be free to accumulate in the space 78.

Further, in a preferred embodiment, the outlet opening 24 has a slightly lesser area than that of the flow area through the inlet 20 so that metering in the device occurs only at the outlet and will remain free because of the self cleaning action provided by the fine filter network 62 and the flow therefrom with respect to the regions on the valving element 48 which collect particles during fuel metering operation.

One of the features of the invention is that if there were a sudden large amount of contamination causing the No. 1 filter 16 bypass valve to open then the slug of contamination could be accommodated by the "bruteforce" rotation of the valve with its self-cleaning action and No. 2 filter 66 would stop an expected small portion of the slug from passing to the center of the valve which can be expected to stay very clean.

While the embodiments of the present invention, as herein disclosed, constitute a preferred form, it is to be understood that other forms might be adopted.

The embodiments of the invention in which an exclusive property or privilege is claimed are defined as follows:

1. A fuel metering valve assembly comprising a housing having a bore therein, means forming an inlet opening and an outlet opening of a predetermined cross sectional flow area, a valve element supported within said bore for relative reciprocation therein, said valve element including an imperforate base segment thereon positionable in overlying relationship to said inlet and said outlet openings to cut off flow therebetween, said valve element further including a reference edge and an annular porous wall segment contiguous to said reference edge, said porous wall segment having an outer surface selectively movable into overlapping relationship with said inlet and said outlet openings and including a flow area therethrough substantially less than that of the exposed flow area through said outlet opening during initial valve opening movements to produce a closely regulated metering of fuel at low flow initial valve opening position without close control of the reference edge position with respect to the outlet opening and means of directing finely filtered fluid into the interface between said porous wall segment and said housing, and means for rotating said valve element to cause said finely filtered flow through said interface to continually flush build up of particles from the outer surface of said porous wall segment during valve operation.

2. A fuel metering valve assembly comprising a housing having a double ended bore therein, means forming an inlet opening and an outlet opening of a predetermined cross sectional flow area, a valve element supported within said bore for relative reciprocation therein, said valve element including an imperforate base segment thereon positionable in overlying relationship to said inlet and said outlet openings to cut off flow therebetween, said valve element further including a reference edge and a tubular segment having an outer surface portion selectively movable into overlapping relationship with said inlet and said outlet openings and including a flow area from said outer surface portion therethrough substantially less than the overlapped area of said inlet and outlet openings to produce a closely regulated metering of fuel at low flow initial valve opening positions, said tubular segment having an opening end thereon exposed to one end of said bore, menas for directing finely filtered fluid into each end of said bore and across the interface between said porous wall segment and said housing, and means for rotating said valve element to cause said finely filtered flow through said interface to continually back flush build up of particles from the outer surface of said porous wall segment during valve operation.

3. A fuel metering valve assembly comprising a housing having a bore therein, means forming an inlet of a first predetermined cross sectional flow area and an outlet of a lesser cross sectional flow area from the housing, a valve element supported within said bore for relative reciprocation therein, said valve element including an imperforate base segment thereon positionable in overlying relationship to said inlet and said outlet to cut off flow therebetween, said valve element further including an annular porous wall segment having an outer surface selectively movable into overlapping relationship with said inlet and said outlet and including a flow area therethrough reduced with respect to the flow area through said outlet during initial valve opening movements to produce a closely regulated metering of fuel at low flow initial valve opening positions and wherein flow control through the valve assembly is established by the porosity of said segment rather than the flow area of the inlet or outlet, means for directing finely filtered fluid into the interface between said porous wall segment and said housing, and means for rotating said valve element to cause said finely filtered flow through said interface to continually back flush build up of particles from the outer surface of said porous wall segment during valve operation.

* * * * *